(12) United States Patent
Liu

(10) Patent No.: US 10,956,424 B2
(45) Date of Patent: Mar. 23, 2021

(54) APPLICATION RECOMMENDING METHOD AND SYSTEM, AND SERVER

(71) Applicant: Huawei Technologies Co., Ltd., Shenzhen (CN)

(72) Inventor: Lianxi Liu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 185 days.

(21) Appl. No.: 16/142,765

(22) Filed: Sep. 26, 2018

(65) Prior Publication Data
US 2019/0026344 A1      Jan. 24, 2019

Related U.S. Application Data

(63) Continuation of application No. 14/897,846, filed as application No. PCT/CN2014/073696 on Mar. 19, 2014, now Pat. No. 10,108,675.

(51) Int. Cl.
*G06F 16/00*      (2019.01)
*G06F 16/2457*      (2019.01)
(Continued)

(52) U.S. Cl.
CPC .......... *G06F 16/24575* (2019.01); *G06F 8/60* (2013.01); *G06F 9/44* (2013.01);
(Continued)

(58) Field of Classification Search
CPC ............ G06F 11/3409; G06F 11/3419; G06F 11/3433; G06F 11/3676; G06F 16/24575;
(Continued)

(56) References Cited

U.S. PATENT DOCUMENTS 8,566,173 B2    10/2013    Mahaniok et al.
8,819,025 B2    8/2014    De Bona et al.
(Continued)

FOREIGN PATENT DOCUMENTS

CN    101959179 A    1/2011
CN    102662679 A    9/2012
(Continued)

OTHER PUBLICATIONS

Machine Translation and Abstract of Chinese Publication No. CN102999588, Mar. 27, 2013, 23 pages.
(Continued)

*Primary Examiner* — Anh Ly
(74) *Attorney, Agent, or Firm* — Conley Rose, P.C.

(57) ABSTRACT

Embodiments of the present disclosure are applicable to the field of communications technologies, and provide an application recommending method and system, and a server. The method includes receiving data reported by at least one terminal, where the data includes static data and first application behavior data that are collected by the at least one terminal, and the static data is used to identify a type of a terminal; obtaining an activity index of each application on terminals of different types according to the first application behavior data; and receiving an application list request sent by a first terminal, querying, according to the application list request, an activity index of each application on terminals that are of the same type with the first terminal, and recommending an application with an activity index greater than a preset first activity index threshold to the first terminal.

20 Claims, 6 Drawing Sheets

---

S101: A server receives data reported by at least one terminal, where the data includes static data and first application behavior data that are collected by the at least one terminal, and the static data is used to identify a type of a terminal S102: The server obtains an activity index of each application on terminals of different types according to the first application behavior data S103: The server receives an application list request sent by a first terminal, queries, according to the application list request, an activity index of each application on terminals that are of the same type with the first terminal, and recommends an application with an activity index greater than a preset first activity index threshold to the first terminal

(51) Int. Cl.
*G06F 16/9038* (2019.01)
*G06F 9/44* (2018.01)
*H04W 8/24* (2009.01)
*G06F 8/60* (2018.01)
*G06F 11/34* (2006.01)
*G06F 11/36* (2006.01)
*G06Q 30/02* (2012.01)

(52) U.S. Cl.
CPC ...... *G06F 11/3409* (2013.01); *G06F 11/3676* (2013.01); *G06F 16/9038* (2019.01); *H04W 8/24* (2013.01); *G06Q 30/0282* (2013.01); *Y02D 10/00* (2018.01)

(58) Field of Classification Search
CPC .......... G06F 16/9038; G06F 8/60; G06F 9/44; G06F 17/30; G06F 11/34; G06F 11/36; G06F 9/445; G06F 16/93; G06Q 30/0282; G06Q 30/02; H04W 8/24; Y02D 10/42
See application file for complete search history.

(56) References Cited

U.S. PATENT DOCUMENTS

| | | | |
|---|---|---|---|
| 8,825,663 | B2 | 9/2014 | Mahaniok et al. |
| 9,055,120 | B1 | 6/2015 | Firman |
| 9,396,092 | B1 | 7/2016 | Kuo et al. |
| 9,641,390 | B2 | 5/2017 | Cudak et al. |
| 9,807,155 | B1 | 10/2017 | Firman |
| 2007/0061796 | A1* | 3/2007 | Atsatt ................ G06F 9/44536 717/166 |
| 2007/0192818 | A1* | 8/2007 | Bourges-Sevenier ............. H04N 21/6125 725/132 |
| 2011/0083127 | A1 | 4/2011 | Georgis et al. |
| 2011/0320307 | A1 | 12/2011 | Mehta et al. |
| 2012/0089918 | A1 | 4/2012 | Kung et al. |
| 2012/0290584 | A1* | 11/2012 | De Bona ................ G06F 8/60 707/741 |
| 2012/0291022 | A1 | 11/2012 | Mehta et al. |
| 2013/0173637 | A1* | 7/2013 | Kim .................... G06Q 30/02 707/748 |
| 2013/0326465 | A1 | 12/2013 | Jain et al. |
| 2013/0339345 | A1* | 12/2013 | Soto Matamala .... G06F 16/248 707/722 |
| 2014/0019456 | A1* | 1/2014 | Li ........................ G06F 21/577 707/741 |
| 2014/0052683 | A1* | 2/2014 | Kirkham ................ G06N 5/04 706/46 |
| 2014/0101654 | A1* | 4/2014 | Chang ..................... G06F 8/62 717/174 |
| 2014/0157387 | A1* | 6/2014 | Lee ........................ H04W 4/50 726/7 |
| 2016/0099963 | A1* | 4/2016 | Mahaffey ............ H04L 63/0227 726/25 |
| 2017/0116552 | A1* | 4/2017 | Deodhar .......... G06Q 10/06316 |
| 2017/0293610 | A1* | 10/2017 | Tran .................... G06Q 10/025 |

FOREIGN PATENT DOCUMENTS

| | | |
|---|---|---|
| CN | 102999588 A | 3/2013 |
| CN | 103338223 A | 10/2013 |
| CN | 103412757 A | 11/2013 |
| CN | 103593434 A | 2/2014 |
| WO | 2012154848 A1 | 11/2012 |

OTHER PUBLICATIONS

Machine Translation and Abstract of Chinese Publication No. CN103338223, Oct. 2, 2013, 17 pages.
Machine Translation and Abstract of Chinese Publication No. CN103412757, Nov. 27, 2013, 16 pages.
Machine Translation and Abstract of Chinese Publication No. CN103593434, Feb. 19, 2014, 31 pages.
Machine Translation and Abstract of Chinese Publication No. CN101959179, Jan. 26, 2011, 18 pages.
Machine Translation and Abstract of Chinese Publication No. CN102662679, Sep. 12, 2012, 18 pages.
Foreign Communication From a Counterpart Application, European Application No. 14886184.2, Extended European Search Report dated May 20, 2016, 7 pages.
Foreign Communication From a Counterpart Application, Chinese Application No. 201480001818.3, Chinese Office Action dated Feb. 8, 2018, 14 pages.
Foreign Communication From a Counterpart Application, PCT Application No. PCT/CN2014/073696, English Translation of International Search Report dated Nov. 28, 2014, 2 pages.
Foreign Communication From a Counterpart Application, PCT Application No. PCT/CN2014/073696, English Translation of Written Opinion dated Nov. 28, 2014, 7 pages.

* cited by examiner

APPLICATION RECOMMENDING METHOD AND SYSTEM, AND SERVER

CROSS-REFERENCE TO RELATED APPLICATIONS

This application is a continuation of U.S. patent application Ser. No. 14/897,846, filed on Dec. 11, 2015, which is a national stage of International Application No. PCT/CN2014/073696, filed on Mar. 19, 2014. Both of the aforementioned applications are hereby incorporated by reference in their entireties.

TECHNICAL FIELD

The present disclosure relates to the field of communications technologies, and in particular, to an application recommending method and system, and a server.

BACKGROUND

Diversification of terminals is a tough problem that all application developers and distribution channels have to face. For different operating systems (OS) and different hardware, considerable workload needs to be taken in migration and adaptation.

For a same type of OS, for example, Android™, a large quantity of Android systems of different versions exist on an existing network, and a variety of read-only memories (ROMs) customized by different manufacturers and a large quantity of device models also exist. Therefore, it is unlikely that an overall coverage test can be conducted for an Android application. For a same application running on different devices, various compatibility problems usually occur, including an installation failure, a running failure, a failure in using some functions after the application runs, and so on.

SUMMARY

Embodiments of the present disclosure provide an application recommending method and system, and a server, to solve a problem that, in a recommending method provided in the prior art, an application recommended to a terminal user is usually incompatible with a terminal when running on the terminal.

According to a first aspect, an application recommending method is provided, where the method includes receiving data reported by at least one terminal, where the data includes static data and first application behavior data that are collected by the at least one terminal, and the static data is used to identify a type of a terminal; obtaining an activity index of each application on terminals of different types according to the first application behavior data; and receiving an application list request sent by a first terminal, querying, according to the application list request, an activity index of each application on terminals that are of the same type with the first terminal, and recommending an application with an activity index greater than a preset first activity index threshold to the first terminal.

In a first possible implementation manner, with reference to the first aspect, the first application behavior data includes at least one piece of the following data: installation time, start time, activation time, deactivation time, stop time, and uninstallation time that are of an application.

In a second possible implementation manner, according to the first possible implementation manner, the obtaining an activity index of each application on terminals of different types according to the first application behavior data includes calculating a sum of application activity degrees of applications on terminals of a particular type; and obtaining an activity index of each application on the terminals of a particular type according to the sum of the application activity degrees and a total quantity of users of the terminals of a particular type.

In a third possible implementation manner, according to the second possible implementation manner, the calculating a sum of application activity degrees of applications on terminals of a particular type includes calculating installation duration of each application on each terminal according to uninstallation time and installation time; and/or calculating running duration of each application on each terminal according to stop time and start time; and/or calculating activity duration of each application on each terminal according to deactivation time and activation time; and/or calculating background running duration of each application on each terminal according to the running duration and the activity duration; and/or calculating a quantity of daily activation times of each application on each terminal; calculating an application activity degree of each application on each terminal according to a combination of one or more of the following: the installation duration, the running duration, the activity duration, the background running duration, and the quantity of daily activation times; and performing a summation on the application activity degrees of the applications on the terminals to obtain the sum of the application activity degrees of applications on the terminals of a particular type.

In a fourth possible implementation manner, with reference to the first aspect and any one of the first possible manner to the third possible implementation manner, the data further includes second application behavior data collected by the at least one terminal; and before or after the receiving an application list request sent by a first terminal, querying, according to the application list request, an activity index of each application on terminals that are of the same type with the first terminal, and recommending an application with an activity index greater than a preset first activity index threshold to the first terminal, the method includes obtaining a preference index of each application on terminals of different types according to the second application data; and after the receiving an application list request sent by a first terminal, querying, according to the application list request, an activity index of each application on terminals that are of the same type with the first terminal, and recommending an application with an activity index greater than a preset first activity index threshold to the first terminal, the method further includes generating label information of an activity index and/or a preference index of each application on the first terminal according to an activity index and/or a preference index of each application recommended to the first terminal; and sending, to the first terminal, the label information of the activity index and/or preference index of each application that is recommended to the first terminal and on the first terminal, so that a user of the first terminal selects an application according to the label information of the activity index and/or preference index of each application that is recommended to the first terminal and on the first terminal.

In a fifth possible implementation manner, according to the fourth possible implementation manner, the second application behavior data includes at least one piece of the following data: occupied memory for each running of an application, power consumption for each running of an application, and flow consumption for each running of an application; and the preference index includes at least one piece of an occupied memory index, a flow consumption index, and a power consumption index.

In a sixth possible implementation manner, according to the fourth possible implementation manner or the fifth possible implementation manner, the obtaining a preference index of each application on terminals of different types according to the second application behavior data includes calculating a flow consumption index of the application according to flow consumption for each running of the application and a quantity of flow reporting times; and/or calculating an occupied memory index of the application according to occupied memory for each running of the application and a quantity of occupied memory reporting times; and/or calculating a power consumption index of the application according to power consumption for each running of the application and a quantity of power consumption reporting times.

According to a second aspect, an application recommending method is provided, where the method includes receiving data reported by at least one terminal, where the data includes static data, and first application behavior data and/or second application behavior data that are collected by the at least one terminal, and the static data is used to identify a type of a terminal; obtaining an activity index of each application on terminals of different types according to the first application behavior data; and/or obtaining a preference index of each application on terminals of different types according to the second application behavior data; and/or obtaining an activity index and/or a preference index of each application on terminals of different types according to the first application behavior data and/or the second application behavior data; querying an activity index and/or a preference index of each application on terminals that are of the same type with the first terminal; generating label information of an activity index and/or a preference index of each application on the first terminal according to an activity index and/or a preference index of each application on the terminals that are of the same type with the first terminal; and sending the label information of the activity index and/or preference index of each application on the first terminal to the first terminal, so that a user of the first terminal selects an application according to the label information of the activity index and/or preference index of each application on the first terminal.

In a first possible implementation manner, with reference to the second aspect, the first application behavior data includes at least one piece of the following data: installation time, start time, activation time, deactivation time, stop time, and uninstallation time that are of an application; the second application behavior data includes at least one piece of the following data: occupied memory for each running of an application, power consumption for each running of an application, and flow consumption for each running of an application; and the preference index includes at least one piece of the following data: an occupied memory index, a flow consumption index, and a power consumption index.

In a second possible implementation manner, according to the first possible implementation manner, the obtaining an activity index of each application on terminals of different types according to the first application behavior data includes calculating a sum of application activity degrees of applications on terminals of a particular type; and obtaining an activity index of each application on the terminals of a particular type according to the sum of the application activity degrees and a total quantity of users of the terminals of a particular type; and the obtaining a preference index of each application on terminals of different types according to the second application behavior data includes calculating a flow consumption index of the application according to flow consumption for each running of the application and a quantity of flow reporting times; and/or calculating an occupied memory index of the application according to occupied memory for each running of the application and a quantity of occupied memory reporting times; and/or calculating a power consumption index of the application according to power consumption for each running of the application and a quantity of power consumption reporting times.

In a third possible implementation manner, according to the second possible implementation manner, the calculating a sum of application activity degrees of applications on terminals of a particular type includes calculating installation duration of each application on each terminal according to uninstallation time and installation time; and/or calculating running duration of each application on each terminal according to stop time and start time; and/or calculating activity duration of each application on each terminal according to deactivation time and activation time; and/or calculating background running duration of each application on each terminal according to the running duration and the activity duration; and/or calculating a quantity of daily activation times of each application on each terminal; calculating an application activity degree of each application on each terminal according to a combination of one or more of the following: the installation duration, the running duration, the activity duration, the background running duration, and the quantity of daily activation times; and performing a summation on the application activity degrees of the applications on the terminals to obtain the sum of the application activity degrees of applications on the terminals of a particular type.

According to a third aspect, a server is provided, where the server includes a reported data receiving unit configured to receive data reported by at least one terminal, where the data includes static data and first application behavior data that are collected by the at least one terminal, and the static data is used to identify a type of a terminal; an activity index calculating unit configured to obtain an activity index of each application on terminals of different types according to the first application behavior data; and an application recommending unit configured to receive an application list request sent by a first terminal, query, according to the application list request, an activity index of each application on terminals that are of the same type with the first terminal, and recommend an application with an activity index greater than a preset first activity index threshold to the first terminal.

In a first possible implementation manner, with reference to the third aspect, the first application behavior data includes at least one piece of the following data: installation time, start time, activation time, deactivation time, stop time, and uninstallation time that are of an application.

In a second possible implementation manner, according to the first possible implementation manner, the activity index calculating unit includes an activity degree sum calculating module configured to calculate a sum of application activity degrees of applications on terminals of a particular type; and an activity index calculating module configured to obtain an activity index of each application on the terminals of a particular type according to the sum of the application activity degrees and a total quantity of users of the terminals of a particular type.

In a third possible implementation manner, according to the second possible implementation manner, the application activity degree sum calculating module includes an installation duration calculating submodule configured to calculate installation duration of each application on each terminal according to uninstallation time and installation time; and/or a running duration calculating submodule configured to calculate running duration of each application on each terminal according to stop time and start time; and/or an activity duration calculating submodule configured to calculate activity duration of each application on each terminal according to deactivation time and activation time; and/or a background running duration calculating submodule configured to calculate background running duration of each application on each terminal according to the running duration and the activity duration; and/or a daily activation times calculating submodule configured to calculate a quantity of daily activation times of each application on each terminal; an application activity degree calculating submodule configured to calculate an application activity degree of each application on each terminal according to a combination of one or more of the installation duration, the running duration, the activity duration, the background running duration, and the quantity of daily activation times; and an application activity degree sum calculating submodule configured to perform a summation on the application activity degrees of the applications on the terminals to obtain the sum of the application activity degrees of applications on the terminals of a particular type.

In a fourth possible implementation manner, with reference to the third aspect or any one of the first possible implementation manner to the third possible implementation manner, the data further includes second application behavior data collected by the at least one terminal, and the server further includes a preference index calculating unit configured to obtain a preference index of each application on terminals of different types according to the second application data; and the server further includes a label information generating unit configured to generate label information of an activity index of each application on the first terminal according to an activity index of each application recommended to the first terminal; and/or generate label information of a preference index of each application on the first terminal according to a preference index of each application recommended to the first terminal; and a label information sending unit configured to send, to the first terminal, the label information of the activity index and/or preference index of each application that is recommended to the first terminal and on the first terminal, so that a user of the first terminal selects an application according to the label information of the activity index and/or preference index of each application that is recommended to the first terminal and on the first terminal.

In a fifth possible implementation manner, according to the fourth possible implementation manner, the second application behavior data includes at least one piece of the following data: occupied memory for each running of an application, power consumption for each running of an application, and flow consumption for each running of an application; and the preference index includes at least one piece of the following data: an occupied memory index, a flow consumption index, and a power consumption index.

In a sixth possible implementation manner, according to the fourth possible implementation manner or the fifth possible implementation manner, the preference index calculating unit includes a flow consumption index calculating module configured to calculate a flow consumption index of the application according to flow consumption for each running of the application and a quantity of flow reporting times; and/or an occupied memory index calculating module configured to calculate an occupied memory index of the application according to occupied memory for each running of the application and a quantity of occupied memory reporting times; and/or a power consumption index calculating module configured to calculate a power consumption index of the application according to power consumption for each running of the application and a quantity of power consumption reporting times.

According to a fourth aspect, a server is provided, where the server includes a data receiving unit configured to receive data reported by at least one terminal, where the data includes static data, and first application behavior data and/or second application behavior data that are collected by the at least one terminal, and the static data is used to identify a type of a terminal; an activity index calculating unit configured to obtain an activity index of each application on terminals of different types according to the first application behavior data; and/or a preference index calculating unit configured to obtain a preference index of each application on terminals of different types according to the second application behavior data; an index querying unit configured to query an activity index and/or a preference index of each application on terminals that are of the same type with the first terminal; a label information generating unit configured to generate label information of an activity index of each application on the first terminal according to an activity index of each application recommended to the first terminal; and/or generate label information of a preference index of each application on the first terminal according to a preference index of each application recommended to the first terminal; and a label information sending unit configured to send the label information of the activity index and/or preference index of each application on the first terminal to the first terminal, so that a user of the first terminal selects an application according to the label information of the activity index and/or preference index of each application on the first terminal.

In a first possible implementation manner, with reference to the fourth aspect, the first application behavior data includes at least one piece of the following data: installation time, start time, activation time, deactivation time, stop time, and uninstallation time that are of an application; the second application behavior data includes at least one piece of the following data: occupied memory for each running of an application, power consumption for each running of an application, and flow consumption for each running of an application; and the preference index includes at least one piece of the following data: an occupied memory index, a flow consumption index, and a power consumption index.

In a second possible implementation manner, according to the first possible implementation manner, the activity index calculating unit includes an activity degree sum calculating module configured to calculate a sum of application activity degrees of applications on terminals of a particular type; and an activity index calculating module configured to obtain an activity index of each application on the terminals of a particular type according to the sum of the application activity degrees and a total quantity of users of the terminals of a particular type; and the preference index calculating unit includes a flow consumption index calculating submodule configured to calculate a flow consumption index of the application according to flow consumption for each running of the application and a quantity of flow reporting times; and/or an occupied memory index calculating submodule configured to calculate an occupied memory index of the application according to occupied memory for each running of the application and a quantity of occupied memory reporting times; and/or a power consumption index calculating submodule configured to calculate a power consumption index of the application according to power consumption for each running of the application and a quantity of power consumption reporting times.

In a third possible implementation manner, according to the second possible implementation manner, the activity degree sum calculating module includes an installation duration calculating submodule configured to calculate installation duration of each application on each terminal according to uninstallation time and installation time; and/or a running duration calculating submodule configured to calculate running duration of each application on each terminal according to stop time and start time; and/or an activity duration calculating submodule configured to calculate activity duration of each application on each terminal according to deactivation time and activation time; and/or a background running duration calculating submodule configured to calculate background running duration of each application on each terminal according to the running duration and the activity duration; and/or a daily activation times calculating submodule configured to calculate a quantity of daily activation times of each application on each terminal; an application activity degree calculating submodule configured to calculate an application activity degree of each application on each terminal according to a combination of one or more of the following: the installation duration, the running duration, the activity duration, the background running duration, and the quantity of daily activation times; and an application activity degree sum calculating submodule configured to perform a summation on the application activity degrees of the applications on the terminals to obtain the sum of the application activity degrees of applications on the terminals of a particular type.

According to a fifth aspect, a server is provided, where the server includes an interface configured to receive data reported by at least one terminal, where the data includes static data and first application behavior data that are collected by the at least one terminal, and the static data is used to identify a type of a terminal; and a processor configured to obtain an activity index of each application on terminals of different types according to the first application behavior data; where the interface is further configured to receive an application list request sent by a first terminal, query, according to the application list request, an activity index of each application on terminals that are of the same type with the first terminal, and recommend an application with an activity index greater than a preset first activity index threshold to the first terminal.

In a first possible implementation manner, with reference to the third aspect, the first application behavior data includes at least one piece of the following data: installation time, start time, activation time, deactivation time, stop time, and uninstallation time that are of an application.

In a second possible implementation manner, according to the first possible implementation manner, the processor first calculates a sum of application activity degrees of applications on terminals of a particular type, and then obtains an activity index of each application on the terminals of a particular type according to the sum of the application activity degrees and a total quantity of users of the terminals of a particular type.

In a third possible implementation manner, according to the second possible implementation manner, the processor calculates installation duration of each application on each terminal according to uninstallation time and installation time; and/or the processor calculates running duration of each application on each terminal according to stop time and start time; and/or the processor calculates activity duration of each application on each terminal according to deactivation time and activation time; and/or the processor calculates background running duration of each application on each terminal according to the running duration and the activity duration; and/or the processor calculates a quantity of daily activation times of each application on each terminal; the processor calculates an application activity degree of each application on each terminal according to a combination of one or more of the following: the installation duration, the running duration, the activity duration, the background running duration, and the quantity of daily activation times; and the processor performs a summation on the application activity degrees of the applications on the terminals to obtain the sum of the application activity degrees of applications on the terminals of a particular type.

In a fourth possible implementation manner, with reference to the fifth aspect or any one of the first possible manner to the third possible implementation manner, the data further includes second application behavior data collected by the at least one terminal, and the processor is further configured to obtain a preference index of each application on terminals of different types according to the second application data; and the processor is further configured to first generate label information of an activity index of each application on the first terminal according to an activity index of each application recommended to the first terminal; and/or generate label information of a preference index of each application on the first terminal according to a preference index of each application recommended to the first terminal; and then send, to the first terminal, the label information of the activity index and/or preference index of each application that is recommended to the first terminal and on the first terminal, so that a user of the first terminal selects an application according to the label information of the activity index and/or preference index of each application that is recommended to the first terminal and on the first terminal.

In a fifth possible implementation manner, according to the fourth possible implementation manner, the second application behavior data includes at least one piece of the following data: occupied memory for each running of an application, power consumption for each running of an application, and flow consumption for each running of an application; and the preference index includes at least one piece of the following data: an occupied memory index, a flow consumption index, and a power consumption index.

In a sixth possible implementation manner, according to the fourth possible implementation manner or the fifth possible implementation manner, the processor calculates a flow consumption index of the application according to flow consumption for each running of the application and a quantity of flow reporting times; and/or the processor calculates an occupied memory index of the application according to occupied memory for each running of the application and a quantity of occupied memory reporting times; and/or the processor calculates a power consumption index of the application according to power consumption for each running of the application and a quantity of power consumption reporting times.

According to a sixth aspect, a server is provided, where the server includes an interface configured to receive data reported by at least one terminal, where the data includes static data, and first application behavior data and/or second application behavior data that are collected by the at least one terminal, and the static data is used to identify a type of a terminal; and a processor configured to obtain an activity index of each application on terminals of different types according to the first application behavior data; and/or configured to obtain a preference index of each application on terminals of different types according to the second application behavior data; where the processor is further configured to query an activity index and/or a preference index of each application on terminals that are of the same type with the first terminal; and generate label information of an activity index of each application on the first terminal according to an activity index of each application recommended to the first terminal; and/or generate label information of a preference index of each application on the first terminal according to a preference index of each application recommended to the first terminal; and the interface is further configured to send the label information of the activity index and/or preference index of each application on the first terminal to the first terminal, so that a user of the first terminal selects an application according to the label information of the activity index and/or preference index of each application on the first terminal.

In a first possible implementation manner, with reference to the six aspect, the first application behavior data includes at least one piece of the following data: installation time, start time, activation time, deactivation time, stop time, and uninstallation time that are of an application; the second application behavior data includes at least one piece of the following data: occupied memory for each running of an application, power consumption for each running of an application, and flow consumption for each running of an application; and the preference index includes at least one piece of the following data: an occupied memory index, a flow consumption index, and a power consumption index.

In a second possible implementation manner, according to the first possible implementation manner, the processor first calculates a sum of application activity degrees of applications on terminals of a particular type, and then obtains an activity index of each application on the terminals of a particular type according to the sum of the application activity degrees and a total quantity of users of the terminals of a particular type; and/or the processor calculates a flow consumption index of the application according to flow consumption for each running of the application and a quantity of flow reporting times; and/or the processor calculates an occupied memory index of the application according to occupied memory for each running of the application and a quantity of occupied memory reporting times; and/or the processor calculates a power consumption index of the application according to power consumption for each running of the application and a quantity of power consumption reporting times.

In a third possible implementation manner, according to the second possible implementation manner, the processor calculates installation duration of each application on each terminal according to uninstallation time and installation time; and/or the processor calculates running duration of each application on each terminal according to stop time and start time; and/or the processor calculates activity duration of each application on each terminal according to deactivation time and activation time; and/or the processor calculates background running duration of each application on each terminal according to the running duration and the activity duration; and/or the processor calculates a quantity of daily activation times of each application on each terminal; the processor calculates an application activity degree of each application on each terminal according to a combination of one or more of the following: the installation duration, the running duration, the activity duration, the background running duration, and the quantity of daily activation times; and the processor performs a summation on the application activity degrees of the applications on the terminals to obtain the sum of the application activity degrees of applications on the terminals of a particular type.

According to a seventh aspect, an application recommending system is provided, where the system includes at least one terminal, the system further includes the foregoing server, where the server is connected to each terminal.

It can be seen from the foregoing solutions that, in the application recommending method provided in the embodiments of the present disclosure, an application recommended to a terminal is an application with a high activity index when running on this type of terminals, and therefore the application recommended to the terminal has relatively good compatibility for the terminal.

BRIEF DESCRIPTION OF DRAWINGS

To describe the technical solutions in the embodiments of the present disclosure more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

The terms used in the embodiments of the present disclosure are merely for the purpose of illustrating specific embodiments, and are not intended to limit the present disclosure. The terms "a", "said" and "the" of singular forms used in the embodiments and the appended claims of the present disclosure are also intended to include plural forms, unless otherwise specified in the context clearly. It should also be understood that the term "and/or" used herein indicates and includes any or all possible combinations of one or more associated listed items.

It should be understood that terms such as "first" and "second" may be used in the embodiments of the present disclosure to describe a variety of terminals and application behavior data, but these terminals and application behavior data should not be limited by these terms. These terms are merely used to distinguish the terminals.

To describe the technical solutions of the present disclosure, the following provides description using specific embodiments.

Figure 1:
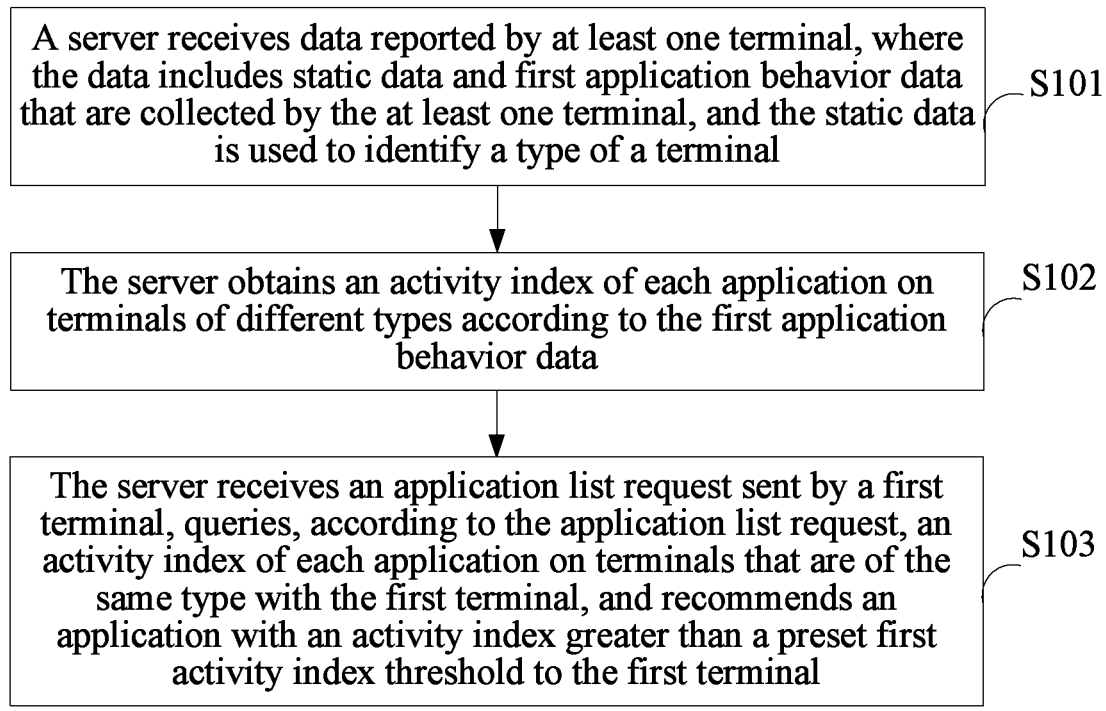
FIG. 1 is an implementation flowchart of an application recommending method according to Embodiment 1.

FIG. 1 shows an implementation process of an application recommending method according to Embodiment 1 of the present disclosure. The following provides a detailed description from a perspective of a server.

Step S101: A server receives data reported by at least one terminal, where the data includes static data and first application behavior data that are collected by the at least one terminal, and the static data is used to identify a type of a terminal.

In this embodiment of the present disclosure, each terminal is responsible for collecting the static data and the first application behavior data.

The static data is data that describes static information of a terminal, terminals of different types can be distinguished using the static data, the static data may include at least one piece of the following data: a terminal model, a quantity of central processing unit (CPU) cores, a total memory size, an available memory size, a resolution, and an OS version number (Android version number), and different user groups can be distinguished using the static data.

Application behavior data is data that describes behavior information of each application running on a terminal. The first application behavior data includes at least one piece of the following data: installation time, start time, activation time (time for switching from background to foreground when an application runs on the background), deactivation time (time for switching from foreground to background when an application runs on the foreground), stop time, and uninstallation time that are of an application, and so on.

Step S102: The server obtains an activity index of each application on terminals of different types according to the first application behavior data.

In this embodiment of the present disclosure, the server calculates the following parameters for a terminal type to obtain an activity index of each application on terminals of a particular type. Terminals mentioned below indicate terminals of a particular type.

Calculating an activity index of each application on terminals of a particular type is implemented in the following two steps.

Step 1: Calculate a sum of application activity degrees of applications on terminals of a particular type to obtain $\Sigma B$, where "$\Sigma$" is a sum operator.

Step 2: Obtain an activity index A of each application on the terminals of a particular type according to the sum of the application activity degrees and a total quantity of users of the terminals of a particular type.

The total quantity Su of users is calculated, and $Su=\Sigma$ (Users), where the total quantity Su of users is a quantity of terminals included in the terminals of a particular type.

The activity index A of each application on the terminals of a particular type can be obtained through calculation using a formula $A=\Sigma B/Su$.

The sum of the application activity degrees of applications on a particular type of terminals can be calculated using a possible combination of the following one or more steps.

Step 11: Calculate installation duration of each application on each terminal according to uninstallation time and installation time.

Installation duration $T\text{inst}$=Uninstallation time−Installation time, where "−" is a minus sign.

Step 12: Calculate running duration of each application on each terminal according to stop time and start time.

Running duration $T\text{run}$=Stop time−Start time.

Step 13: Calculate activity duration of each application on each terminal according to deactivation time and activation time.

Activity duration $T\text{active}$=Deactivation time−Activation time.

Step 14: Calculate background running duration of each application on each terminal according to the running duration and the activity duration.

Background running duration $T\text{back}=T\text{run}-T\text{active}$.

Step 15: Calculate a quantity of daily activation times of each application on each terminal.

Daily activation times $C\text{sum}$=Sum or times measured on a daily basis.

Step 16: Calculate an application activity degree of each application on each terminal according to a combination of one or more of the following: the installation duration, the running duration, the activity duration, the background running duration, and the quantity of daily activation times.

Application activity degree $B=a1*C\text{sum}+a2*T\text{active}+a3*T\text{run}+a4*T\text{inst}+a5*T\text{back}$, where $a1+a2+a3+a4+a5=1$.

Step 17. Perform a summation on the application activity degrees of the applications on the terminals to obtain the application activity degrees of applications on the terminals of a particular type.

A summation is performed on the application activity degrees of applications on the terminals to obtain $\Sigma B$.

The server can determine a terminal type according to the static data reported by the terminal, and use all terminals reporting same static data as terminals of one type.

Step S103: The server receives an application list request sent by a first terminal, queries, according to the application list request, an activity index of each application on terminals that are of the same type with the first terminal, and recommends an application with an activity index greater than a preset first activity index threshold to the first terminal.

In this embodiment of the present disclosure, after obtaining the activity index of each application on the terminals of different types through calculation, the server stores the activity index of each application on the terminals of different types.

The first terminal sends the application list request to the server, to request the server to send a list of recommended applications to the first terminal, where the application list request includes static data of the first terminal, and the static data is used to identify a type of the first terminal.

After receiving the application list request sent by the first terminal, the server first acquires a type of the first terminal according to the application list request, acquires, according to the type of the first terminal, an activity index of each application on terminals that are of the same type with the first terminal, selects applications with an activity index greater than a preset first activity index threshold, and then sends an application list formed by these applications to the first terminal. After receiving the application list, the first terminal may browse and download the applications in the application list.

In the application recommending method provided in this embodiment of the present disclosure, an application recommended to a first terminal by a server is an application with a high activity index, where the application with a high activity index represents, to some extent, that the application can run smoothly on the first terminal, and the application recommended to the first terminal by the server has relatively good compatibility for the first terminal.

Figure 2:
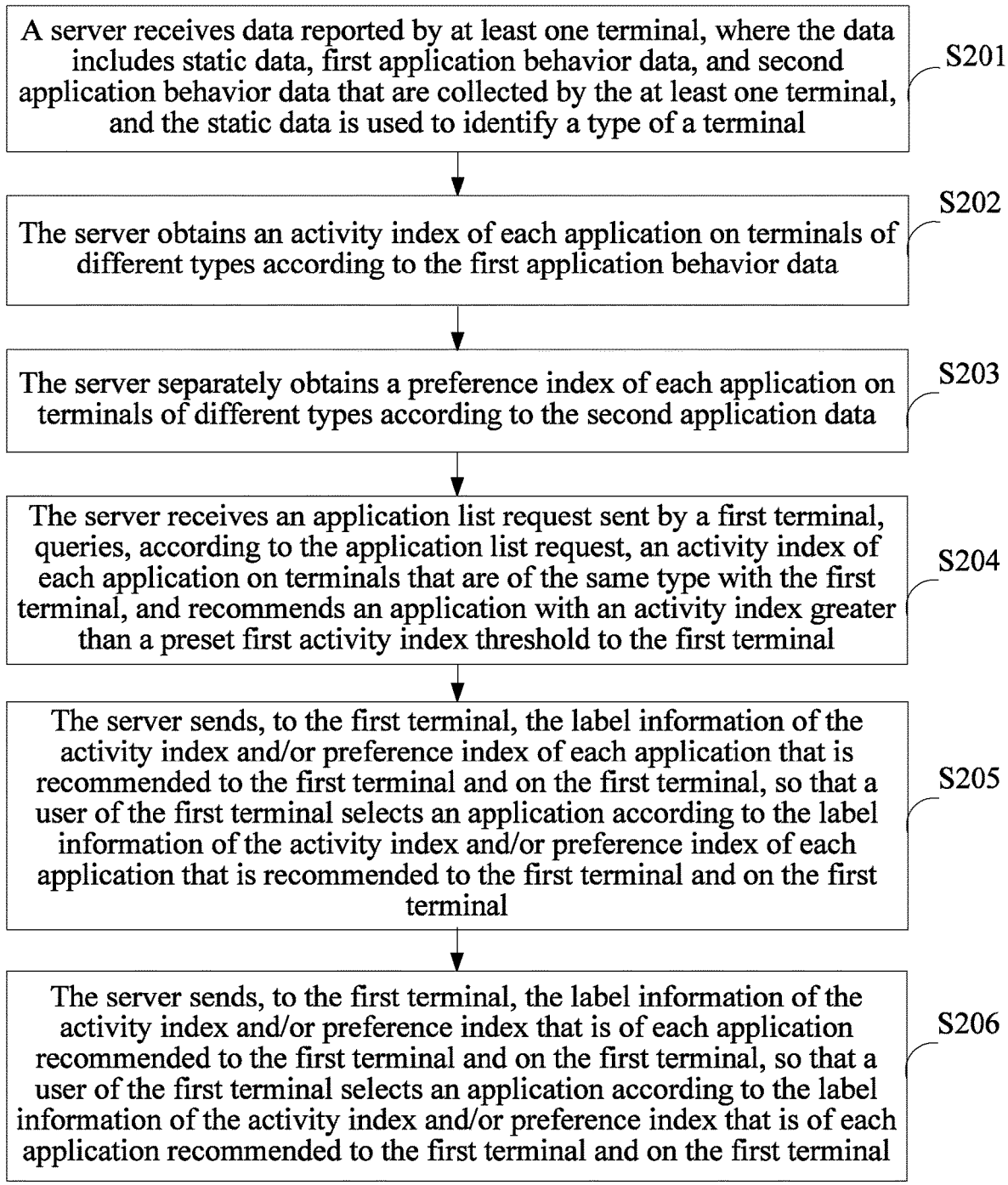
FIG. 2 is an implementation flowchart of an application recommending method according to Embodiment 2 of the present disclosure.

FIG. 2 shows an implementation process of an application recommending method according to Embodiment 2 of the present disclosure. The following provides a detailed description from a perspective of a server.

Step S201: A server receives data reported by at least one terminal, where the data includes static data, first application behavior data, and second application behavior data that are collected by the at least one terminal, and the static data is used to identify a type of a terminal.

In this embodiment of the present disclosure, application behavior data is data that describes behavior information of each application running on a terminal. The first application behavior data includes at least one piece of the following data: installation time, start time, activation time (time for switching from background to foreground when an application runs on the background), deactivation time (time for switching from foreground to background when an application runs on the foreground), stop time, and uninstallation time that are of an application, and so on.

The second application behavior data includes at least one piece of the following data: occupied memory for each running of an application (occupied memory after activation and occupied memory after deactivation), flow consumption for each running of an application, and power consumption for each running of an application.

That a terminal reports both first application behavior data and second application behavior data to a server is used as an example below to describe in detail a process of reporting data by the terminal to the server.

An application manager (App manager) (a framework in an Android system), an application (APP), an agent, and an application store client (Appstore Client) are included in the terminal, as shown in FIG. 2.

The App manager is responsible for starting, stopping, activating, and deactivating an application APP, and so on; in addition, the App manager can collect flow, power consumption, an occupied memory status, and so on when the APP is running.

The APP is an actual application that runs on the terminal. Generally, multiple APPs are installed on one terminal.

The Agent is responsible for collecting and reporting data.

The Appstore Client is an application store client (or a web page), and is responsible for requesting an application list from a server and displaying the application list on the terminal, so that a user can browse, download, and install an application.

When an application-related operation is executed, the App manager notifies the Agent. In addition, the Agent can acquire information, such as occupied memory, flow consumption, and power consumption of a specified application, from the App manager. After collecting the static data, the first application behavior data, and the second application behavior data, the Agent first stores the data locally, and when a data amount of the data reaches a specific size or after a storage time of the data exceeds a specific time, sends the data to the server.

Step S202: The server obtains an activity index of each application on terminals of different types according to the first application behavior data.

In this embodiment of the present disclosure, the server obtains the activity index of each application on the terminals of different types according to the first application behavior data. For details about a process of calculating the activity index, reference is made to the description in Embodiment 1, and details are not described herein again.

Step S203: The server separately obtains a preference index of each application on terminals of different types according to the second application data.

In this embodiment of the present disclosure, the server calculates the preference index of each application on the terminals of different types according to the second application data, where the preference index includes at least one piece of the following data: a flow consumption index, an occupied memory index, and a power consumption index.

Calculating the preference index of each application on the terminals of different types according to the second application behavior data includes the following steps.

The server calculates a flow consumption index of the application according to flow consumption e for each running of the application and a quantity of flow reporting times $T_{flow}$. Flow consumption index $E=Avg(e)/T_{flow}$, where "Avg" is a function sign for calculating an average value.

The server calculates a memory usage index of the application according to occupied memory m for each running of the application and a quantity of memory reporting times $T_{memory}$. Occupied memory index $M=Avg(m)/T_{memory}$.

The server calculates a power consumption index of the application according to power consumption e for each running of the application and a quantity of power reporting times $T_e$. Power consumption index $M=Avg(e)/T_e$.

It should be noted that step S203 may be performed before step S202, or may be performed after step S204.

Step S204: The server receives an application list request sent by a first terminal, queries, according to the application list request, an activity index of each application on terminals that are of the same type with the first terminal, and recommends an application with an activity index greater than a preset first activity index threshold to the first terminal.

In this embodiment of the present disclosure, after obtaining the activity index of each application on the terminals of different types through calculation, the server stores the activity index of each application on the terminals of different types.

The first terminal sends the application list request to the server, to request the server to send a list of recommended applications to the first terminal, where the application list request includes static data of the first terminal, and the static data is used to identify a type of the first terminal.

After receiving the application list request sent by the first terminal, the server first acquires a type of the first terminal according to the application list request, acquires, according to the type of the first terminal, an activity index of each application on terminals that are of the same type with the first terminal, selects applications with an activity index greater than a preset first activity index threshold, and then sends an application list formed by these applications to the first terminal. After receiving the application list, the first terminal may browse and download the applications in the application list.

Step S205: The server generates label information of an activity index of each application on the first terminal according to an activity index of each application recommended to the first terminal; and/or generates label information of a preference index of each application on the first terminal according to a preference index of each application recommended to the first terminal.

In this embodiment of the present disclosure, the server divides, according to a preset second activity index threshold and a preset third activity index threshold, activity indexes of applications recommended to the first terminal into three ranges. For an activity index greater than the third activity index threshold, the server sets label information corresponding to the activity index to high; for an activity index less than the third activity index threshold and greater than the second activity index threshold, the server sets label information corresponding to the activity index to medium; and for an activity index less than the second activity index threshold, the server sets label information corresponding to the activity index to low. The third activity index threshold is greater than the second activity index threshold, and the second activity index threshold is greater than the first activity index threshold.

The setting of the label information of the occupied memory index, the flow consumption index, and the power consumption index that are in the preference index is the same as that of setting the label information of the activity index, and details are not described herein again. The set label information is as follows:

Application activity index: high, medium, low
Occupied memory index: high, medium, low
Flow consumption index: high, medium, low
Power consumption index: high, medium, low
Background running: yes, no Step S206: The server sends, to the first terminal, the label information of the activity index and/or preference index of each application that is recommended to the first terminal and on the first terminal, so that a user of the first terminal selects an application according to the label information of the activity index and/or preference index of each application that is recommended to the first terminal and on the first terminal.

In this embodiment of the present disclosure, after generating the label information of the activity index and/or preference index of each application that is recommended to the first terminal and on the first terminal, the server sends, to the first terminal, the label information of the activity index and/or preference index of each application that is recommended to the first terminal and on the first terminal, the first terminal receives and displays the label information of the activity index and/or preference index of each application that is recommended to the first terminal and on the first terminal, and a user of the first terminal selects, according to the label information of the activity index and/or preference index of each application that is recommended to the first terminal and on the first terminal, an application required by the user, for download and installation.

In conclusion, in the application recommending method provided in this embodiment of the present disclosure, an application with an activity index greater than a preset first activity index threshold is first recommended to a first terminal, and then label information of an activity index and/or a preference index of each application that is recommended to the first terminal and on the first terminal is calculated, and the label information of the activity index and/or preference index of each application that is recommended to the first terminal and on the first terminal is sent to the first terminal, so that a user of the first terminal can select, according to the label information of the activity index and/or preference index of each application that is recommended to the first terminal and on the first terminal, and according to preference of the user, one or more applications for download and installation, thereby actually reflecting a preference requirement of the user.

Figure 3:
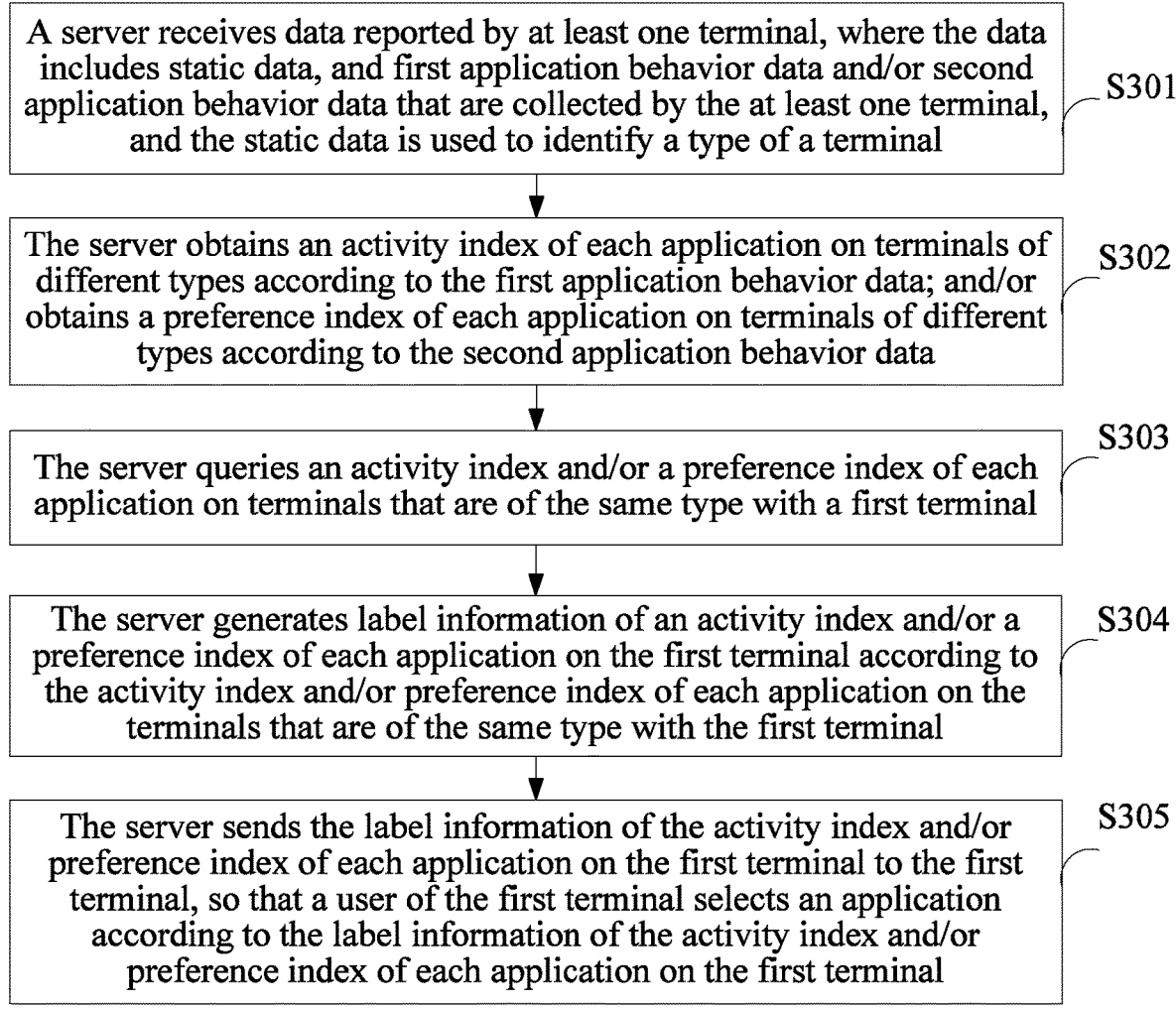
FIG. 3 is an implementation flowchart of an application recommending method according to Embodiment 3 of the present disclosure.

FIG. 3 shows an implementation process of an application recommending method according to Embodiment 3 of the present disclosure. The following provides a detailed description from a perspective of a server.

Step S301: A server receives data reported by at least one terminal, where the data includes static data, and first application behavior data and/or second application behavior data that are collected by the at least one terminal, and the static data is used to identify a type of a terminal.

In this embodiment of the present disclosure, the first application behavior data includes at least one piece of the following data: installation time, start time, activation time (time for switching from background to foreground when an application runs on the background), deactivation time (time for switching from foreground to background when an application runs on the foreground), stop time, and uninstallation time that are of an application, and so on.

The second application behavior data includes at least one piece of the following data: occupied memory for each running of an application (occupied memory after activation and occupied memory after deactivation), flow consumption for each running of an application, and power consumption for each running of an application.

The data received by the server may include the first application behavior data and the second application behavior data, or may include only one of the first application behavior data and the second application behavior data.

Step S302: The server obtains an activity index of each application on terminals of different types according to the first application behavior data; and/or obtains a preference index of each application on terminals of different types according to the second application behavior data.

Step S303: The server queries an activity index and/or a preference index of each application on terminals that are of the same type with the first terminal.

In this embodiment of the present disclosure, the server acquires a type of the first terminal, and acquires, according to the type of the first terminal, an activity index and/or a preference index of each application on terminals that are of the same type with the first terminal.

Step S304: The server generates label information of an activity index and/or a preference index of each application on the first terminal according to the activity index and/or preference index of each application on the terminals that are of the same type with the first terminal.

In this embodiment of the present disclosure, for details about a process of generating the label information, reference is made to the description in Embodiment 2, and details are not described herein again.

Step S305: The server sends the label information of the activity index and/or preference index of each application on the first terminal to the first terminal, so that a user of the first terminal selects an application according to the label information of the activity index and/or preference index of each application on the first terminal.

In this embodiment of the present disclosure, after generating the label information of the activity index and/or preference index of each application on the first terminal, the server sends the label information of the activity index and/or preference index of each application on the first terminal to the first terminal, and the first terminal displays corresponding label information to the user, thereby facilitating selection, by the user, of an application required by the user.

In conclusion, in the application recommending method provided in this embodiment of the present disclosure, an activity index and/or a preference index of each application on terminals that are of the same type with a first terminal is first obtained through calculation, and then label information of an activity index and/or a preference index of each application on the first terminal is generated, and the label information of the activity index and/or preference index of each application on the first terminal is sent to the first terminal, so that a user of the first terminal can select, according to the label information of the activity index and/or preference index of each application on the first terminal, and according to preference of the user, one or more applications for download and installation, thereby actually reflecting the preference of the user.

Figure 4:
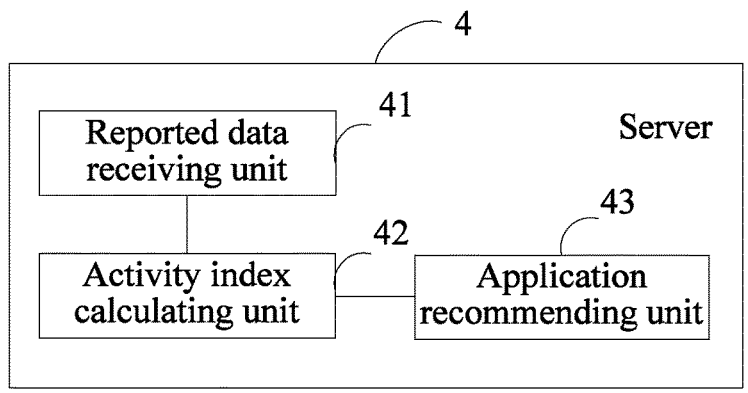
FIG. 4 is a structural block diagram of a server according to Embodiment 4 of the present disclosure.

FIG. 4 shows a structural block diagram of a server 4 according to Embodiment 4 of the present disclosure. The server 4 is configured to perform the application recommending method according to Embodiment 1. For ease of description, only a part related to this embodiment of the present disclosure is shown. The server 4 includes a reported data receiving unit 41, an activity index calculating unit 42, and an application recommending unit 43.

The reported data receiving unit 41 is configured to receive data reported by at least one terminal, where the data includes static data and first application behavior data that are collected by the at least one terminal, and the static data is used to identify a type of a terminal.

The activity index calculating unit 42 is configured to obtain an activity index of each application on terminals of different types according to the first application behavior data.

The application recommending unit 43 is configured to receive an application list request sent by a first terminal, query, according to the application list request, an activity index of each application on terminals that are of the same type with the first terminal, and recommend an application with an activity index greater than a preset first activity index threshold to the first terminal.

The first application behavior data includes at least one piece of the following data: installation time, start time, activation time, deactivation time, stop time, and uninstallation time that are of an application.

The activity index calculating unit 42 includes an activity degree sum calculating module configured to calculate a sum of application activity degrees of applications on terminals of a particular type; and an activity index calculating module configured to obtain an activity index of each application on the terminals of a particular type according to the sum of the application activity degrees and a total quantity of users of the terminals of a particular type.

The application activity degree sum calculating module includes an installation duration calculating submodule configured to calculate installation duration of each application on each terminal according to uninstallation time and installation time; and/or a running duration calculating submodule configured to calculate running duration of each application on each terminal according to stop time and start time; and/or an activity duration calculating submodule configured to calculate activity duration of each application on each terminal according to deactivation time and activation time; and/or a background running duration calculating submodule configured to calculate background running duration of each application on each terminal according to the running duration and the activity duration; and/or a daily activation times calculating submodule configured to calculate a quantity of daily activation times of each application on each terminal; an application activity degree calculating submodule configured to calculate an application activity degree of each application on each terminal according to a combination of one or more of the following: the installation duration, the running duration, the activity duration, the background running duration, and the quantity of daily activation times; and an application activity degree sum calculating submodule configured to perform a summation on the application activity degrees of the applications on the terminals to obtain the sum of the application activity degrees of applications on the terminals of a particular type.

The server provided in this embodiment of the present disclosure may be applied to Embodiment 1 of the foregoing corresponding method. For details, reference is made to the description in Embodiment 1, and details are not described herein again.

Figure 5:
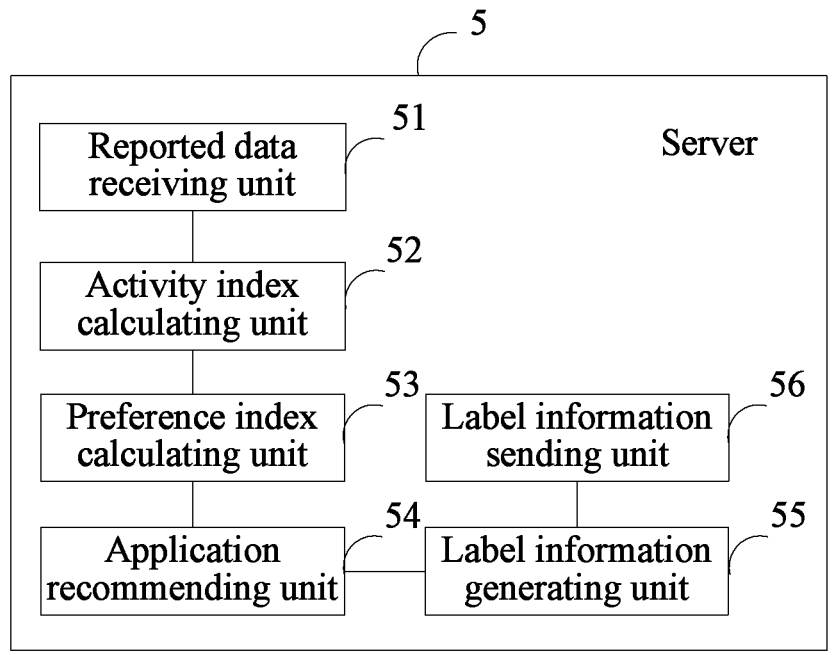
FIG. 5 is a structural block diagram of a server according to Embodiment 5 of the present disclosure.

FIG. 5 shows a structural block diagram of a server 5 according to Embodiment 5 of the present disclosure. The server 5 is configured to perform the application recommending method according to Embodiment 2. For ease of description, only a part related to this embodiment of the present disclosure is shown. The server 5 includes a reported data receiving unit 51, an activity index calculating unit 52, a preference index calculating unit 53, an application recommending unit 54, a label information generating unit 55, and a label information sending unit 56.

The reported data receiving unit 51 is configured to receive data reported by at least one terminal, where the data includes static data and first application behavior data that are collected by the at least one terminal, and the static data is used to identify a type of a terminal; and the first application behavior data includes at least one piece of the following data: installation time, start time, activation time, deactivation time, stop time, and uninstallation time that are of an application. The reported data receiving unit 51 further receives second application behavior data collected by at least one terminal, where the second application behavior data includes at least one piece of the following data: occupied memory for each running of an application, power consumption for each running of an application, and flow consumption for each running of an application.

The activity index calculating unit 52 is configured to obtain an activity index of each application on terminals of different types according to the first application behavior data.

The preference index calculating unit 53 is configured to obtain a preference index of each application on terminals of different types according to the second application data, where the preference index includes at least one piece of the following data: an occupied memory index, a flow consumption index, and a power consumption index.

The application recommending unit 54 is configured to receive an application list request sent by a first terminal, query, according to the application list request, an activity index of each application on terminals that are of the same type with the first terminal, and recommend an application with an activity index greater than a preset first activity index threshold to the first terminal.

The label information generating unit 55 is configured to generate label information of an activity index of each application on the first terminal according to an activity index of each application recommended to the first terminal; and/or generate label information of a preference index of each application on the first terminal according to a preference index of each application recommended to the first terminal.

The label information sending unit 56 is configured to send, to the first terminal, the label information of the activity index and/or preference index of each application that is recommended to the first terminal and on the first terminal, so that a user of the first terminal selects an application according to the label information of the activity index and/or preference index of each application that is recommended to the first terminal and on the first terminal.

The preference index includes at least one piece of the following data: an occupied memory index, a flow consumption index, and a power consumption index.

The preference index calculating unit 53 includes a flow consumption index calculating module configured to calculate a flow consumption index of the application according to flow consumption for each running of the application and a quantity of flow reporting times; and/or an occupied memory index calculating module configured to calculate an occupied memory index of the application according to occupied memory for each running of the application and a quantity of occupied memory reporting times; and/or a power consumption index calculating module configured to calculate a power consumption index of the application according to power consumption for each running of the application and a quantity of power consumption reporting times.

The server provided in this embodiment of the present disclosure may be applied to Embodiment 2 of the foregoing corresponding method. For details, reference is made to the description in Embodiment 2, and details are not described herein again.

Figure 6:
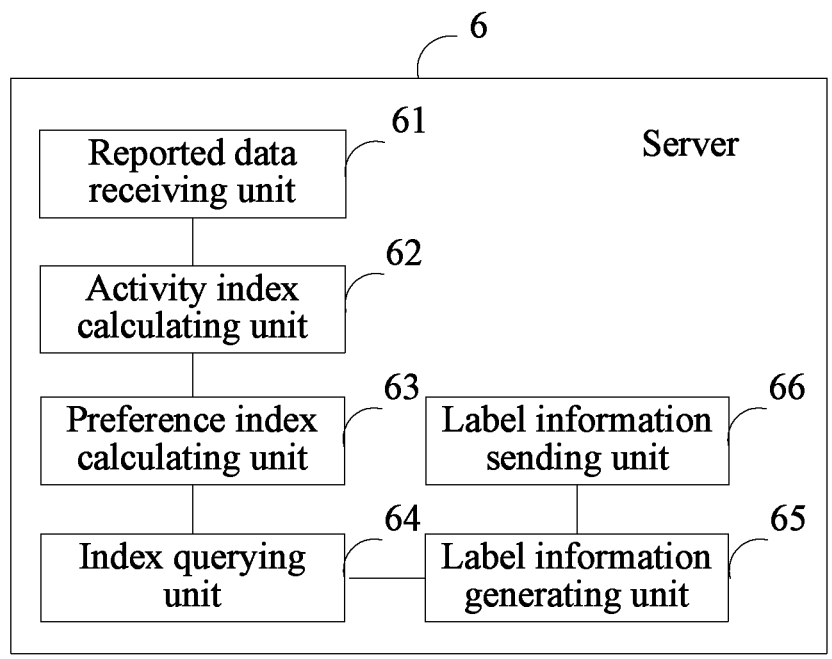
FIG. 6 is a structural block diagram of a server according to Embodiment 6 of the present disclosure.

FIG. 6 shows a structural block diagram of a server 6 according to Embodiment 6 of the present disclosure. The server 6 is configured to perform the application recommending method according to Embodiment 3. For ease of description, only a part related to this embodiment of the present disclosure is shown. The server 6 includes a reported data receiving unit 61, an activity index calculating unit 62, and/or a preference index calculating unit 63, an index querying unit 64, a label information generating unit 65, and a label information sending unit 66.

The reported data receiving unit 61 is configured to receive data reported by at least one terminal, where the data includes static data, and first application behavior data and/or second application behavior data that are collected by the at least one terminal, and the static data is used to identify a type of a terminal.

The activity index calculating unit 62 is configured to obtain an activity index of each application on terminals of different types according to the first application behavior data; and/or the preference index calculating unit 63 is configured to obtain a preference index of each application on terminals of different types according to the second application behavior data.

The index querying unit 64 is configured to query an activity index and/or a preference index of each application on terminals that are of the same type with the first terminal.

The label information generating unit 65 is configured to generate label information of an activity index of each application on the first terminal according to an activity index of each application recommended to the first terminal; and/or generate label information of a preference index of each application on the first terminal according to a preference index of each application recommended to the first terminal.

The label information sending unit 66 is configured to send the label information of the activity index and/or preference index of each application on the first terminal to the first terminal, so that a user of the first terminal selects an application according to the label information of the activity index and/or preference index of each application on the first terminal.

The first application behavior data includes at least one piece of the following data: installation time, start time, activation time, deactivation time, stop time, and uninstallation time that are of an application; the second application behavior data includes at least one piece of the following data: occupied memory for each running of an application, power consumption for each running of an application, and flow consumption for each running of an application; and the preference index includes at least one piece of the following data: an occupied memory index, a flow consumption index, and a power consumption index.

The activity index calculating unit 62 includes an activity degree sum calculating module configured to calculate a sum of application activity degrees of applications on terminals of a particular type; and an activity index calculating module configured to obtain an activity index of each application on the terminals of a particular type according to the sum of the application activity degrees and a total quantity of users of the terminals of a particular type; and the preference index calculating unit 63 includes a flow consumption index calculating submodule configured to calculate a flow consumption index of the application according to flow consumption for each running of the application and a quantity of flow reporting times; and/or an occupied memory index calculating submodule configured to calculate an occupied memory index of the application according to occupied memory for each running of the application and a quantity of occupied memory reporting times; and/or a power consumption index calculating submodule configured to calculate a power consumption index of the application according to power consumption for each running of the application and a quantity of power consumption reporting times.

The activity degree sum calculating module includes an installation duration calculating submodule configured to calculate installation duration of each application on each terminal according to uninstallation time and installation time; and/or a running duration calculating submodule configured to calculate running duration of each application on each terminal according to stop time and start time; and/or an activity duration calculating submodule configured to calculate activity duration of each application on each terminal according to deactivation time and activation time; and/or a background running duration calculating submodule configured to calculate background running duration of each application on each terminal according to the running duration and the activity duration; and/or a daily activation times calculating submodule configured to calculate a quantity of daily activation times of each application on each terminal; an application activity degree calculating submodule configured to calculate an application activity degree of each application on each terminal according to a combination of one or more of the following: the installation duration, the running duration, the activity duration, the background running duration, and the quantity of daily activation times; and an application activity degree sum calculating submodule configured to perform a summation on the application activity degrees of the applications on the terminals to obtain the sum of the application activity degrees of applications on the terminals of a particular type.

The server provided in this embodiment of the present disclosure may be applied to Embodiment 3 of the foregoing corresponding method. For details, reference is made to the description in Embodiment 3, and details are not described herein again.

Figure 7:
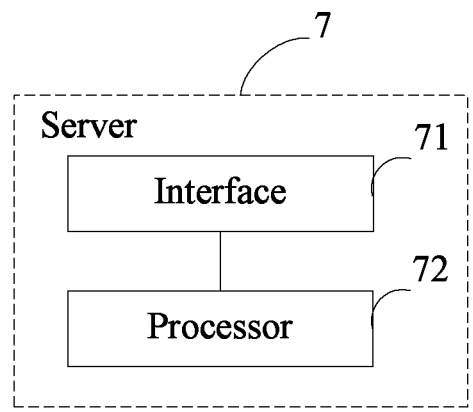
FIG. 7 is a structural block diagram of a server according to Embodiment 7 of the present disclosure.

FIG. 7 shows a structural block diagram of a server 7 according to Embodiment 5 of the present disclosure. The server 7 is configured to perform the application recommending method according to Embodiment 1. The server 7 includes an interface 71 and a processor 72.

The interface 71 is configured to receive data reported by at least one terminal, where the data includes static data and first application behavior data that are collected by the at least one terminal, and the static data is used to identify a type of a terminal.

The processor 72 is configured to obtain an activity index of each application on terminals of different types according to the first application behavior data.

The interface 71 is further configured to receive an application list request sent by a first terminal, query, according to the application list request, an activity index of each application on terminals that are of the same type with the first terminal, and recommend an application with an activity index greater than a preset first activity index threshold to the first terminal.

The first application behavior data includes at least one piece of the following data: installation time, start time, activation time, deactivation time, stop time, and uninstallation time that are of an application.

The processor 72 first calculates a sum of application activity degrees of applications on terminals of a particular type, and then obtains an activity index of each application on the terminals of a particular type according to the sum of the application activity degrees and a total quantity of users of the terminals of a particular type.

The processor 72 calculates installation duration of each application on each terminal according to uninstallation time and installation time; and/or the processor 72 calculates running duration of each application on each terminal according to stop time and start time; and/or the processor 72 calculates activity duration of each application on each terminal according to deactivation time and activation time; and/or the processor 72 calculates background running duration of each application on each terminal according to the running duration and the activity duration; and/or the processor 72 calculates a quantity of daily activation times of each application on each terminal; the processor 72 calculates an application activity degree of each application on each terminal according to a combination of one or more of the following: the installation duration, the running duration, the activity duration, the background running duration, and the quantity of daily activation times; and the processor 72 performs a summation on the application activity degrees of the applications on the terminals to obtain the sum of the application activity degrees of applications on the terminals of a particular type.

The server provided in this embodiment of the present disclosure may be applied to Embodiment 1 of the foregoing corresponding method. For details, reference is made to the description in Embodiment 1, and details are not described herein again.

Figure 8:
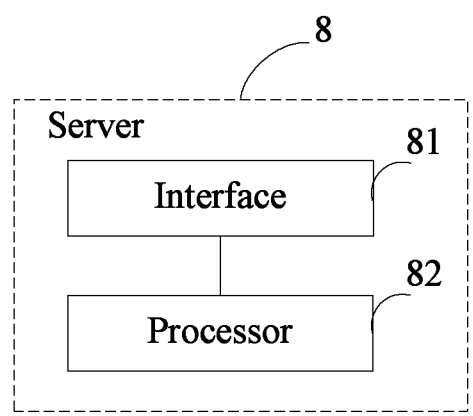
FIG. 8 is a structural block diagram of a server according to Embodiment 8 of the present disclosure.

FIG. 8 shows a structural block diagram of a server 8 according to Embodiment 8 of the present disclosure. The server 8 is configured to perform the application recommending method according to Embodiment 2. The server 8 includes an interface 81 and a processor 82.

The interface 81 is configured to receive data reported by at least one terminal, where the data includes static data, and first application behavior data and/or second application behavior data that are collected by the at least one terminal, and the static data is used to identify a type of a terminal; the first application behavior data includes at least one piece of the following data: installation time, start time, activation time, deactivation time, stop time, and uninstallation time that are of an application; and the second application behavior data includes at least one piece of the following data: occupied memory for each running of an application, power consumption for each running of an application, and flow consumption for each running of an application.

The processor 82 is configured to obtain an activity index of each application on terminals of different types according to the first application behavior data; and/or configured to obtain a preference index of each application on terminals of different types according to the second application behavior data; where the preference index includes at least one piece of the following data: an occupied memory index, a flow consumption index, and a power consumption index.

The processor 82 is further configured to first generate label information of an activity index of each application on the first terminal according to an activity index of each application recommended to the first terminal; and/or generate label information of a preference index of each application on the first terminal according to a preference index of each application recommended to the first terminal; and then send, to the first terminal, the label information of the activity index and/or preference index of each application that is recommended to the first terminal and on the first terminal, so that a user of the first terminal selects an application according to the label information of the activity index and/or preference index of each application that is recommended to the first terminal and on the first terminal.

The processor 82 calculates a flow consumption index of the application according to flow consumption for each running of the application and a quantity of flow reporting times; and/or the processor calculates an occupied memory index of the application according to occupied memory for each running of the application and a quantity of occupied memory reporting times; and/or the processor calculates a power consumption index of the application according to power consumption for each running of the application and a quantity of power consumption reporting times.

The server provided in this embodiment of the present disclosure may be applied to Embodiment 2 of the foregoing corresponding method. For details, reference is made to the description in Embodiment 2, and details are not described herein again.

Figure 9:
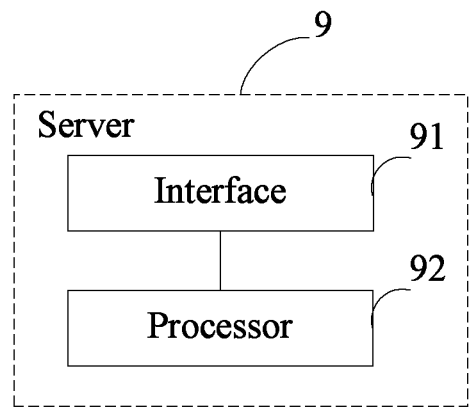
FIG. 9 is a structural block diagram of a server according to Embodiment 9 of the present disclosure.

FIG. 9 shows a structural block diagram of a server 9 according to Embodiment 9 of the present disclosure. The server 9 is configured to perform the application recommending method according to embodiment 3. The server 9 includes an interface 91 and a processor 92.

The interface 91 is configured to receive data reported by at least one terminal, where the data includes static data, and first application behavior data and/or second application behavior data that are collected by the at least one terminal, and the static data is used to identify a type of a terminal.

The processor 92 is configured to obtain an activity index of each application on terminals of different types according to the first application behavior data; and/or configured to obtain a preference index of each application on terminals of different types according to the second application behavior data.

The processor 92 is further configured to query an activity index and/or a preference index of each application on terminals that are of the same type with the first terminal; and generate label information of an activity index of each application on the first terminal according to an activity index of each application recommended to the first terminal; and/or generate label information of a preference index of each application on the first terminal according to a preference index of each application recommended to the first terminal.

The interface 91 is further configured to send the label information of the activity index and/or preference index of each application on the first terminal to the first terminal, so that a user of the first terminal selects an application according to the label information of the activity index and/or preference index of each application on the first terminal.

The first application behavior data includes at least one piece of the following data: installation time, start time, activation time, deactivation time, stop time, and uninstallation time that are of an application; the second application behavior data includes at least one piece of the following data: occupied memory for each running of an application, power consumption for each running of an application, and flow consumption for each running of an application; and the preference index includes at least one piece of the following data: an occupied memory index, a flow consumption index, and a power consumption index.

The processor 92 first calculates a sum of application activity degrees of applications on terminals of a particular type, and then obtains an activity index of each application on the terminals of a particular type according to the sum of the application activity degrees and a total quantity of users of the terminals of a particular type; and/or the processor 92 calculates a flow consumption index of the application according to flow consumption for each running of the application and a quantity of flow reporting times; and/or the processor 92 calculates an occupied memory index of the application according to occupied memory for each running of the application and a quantity of occupied memory reporting times; and/or the processor 92 calculates a power consumption index of the application according to power consumption for each running of the application and a quantity of power consumption reporting times.

The processor 92 calculates installation duration of each application on each terminal according to uninstallation time and installation time; and/or the processor 92 calculates running duration of each application on each terminal according to stop time and start time; and/or the processor 92 calculates activity duration of each application on each terminal according to deactivation time and activation time; and/or the processor 92 calculates background running duration of each application on each terminal according to the running duration and the activity duration; and/or the processor 92 calculates a quantity of daily activation times of each application on each terminal; the processor 92 calculates an application activity degree of each application on each terminal according to a combination of one or more of the following: the installation duration, the running duration, the activity duration, the background running duration, and the quantity of daily activation times; and the processor 92 performs a summation on the application activity degrees of the applications on the terminals to obtain the sum of the application activity degrees of applications on the terminals of a particular type.

Figure 10:
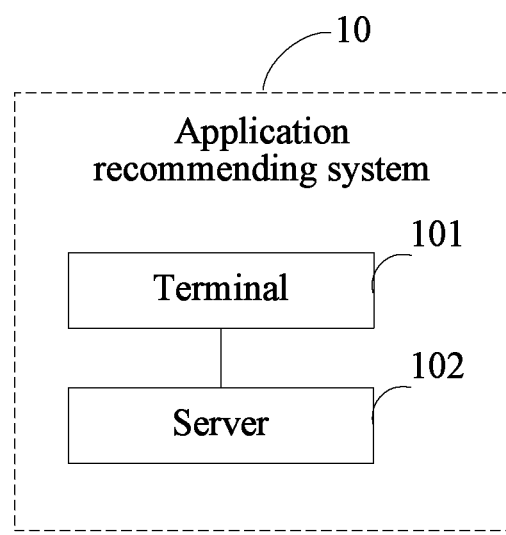
FIG. 10 is a structural block diagram of an application recommending system according to Embodiment 10 of the present disclosure.

FIG. 10 shows a structural block diagram of an application recommending system 10 according to Embodiment 10 of the present disclosure. The application recommending system 10 includes at least one terminal 101 and further includes a server 102, where the server 102 is connected to each terminal 101. For brevity, one of the terminals 101 is shown in FIG. 10. After the at least one terminal 101 reports application behavior data to the server 102, the server 102 may obtain, through calculation according to the received application behavior data, an activity index of each application on the first terminal, and recommend an application with an activity index greater than a preset first activity index threshold to the first terminal; or may further calculate label information of an activity index and/or a preference index of each application that is recommended to the first terminal and on the first terminal, and send, to the first terminal, the label information of the activity index and/or preference index of each application that is recommended to the first terminal and on the first terminal, so that a user of the first terminal can select, according to the label information of the activity index and/or preference index of each application that is recommended to the first terminal and on the first terminal and according to preference of the user, one or more applications for download and installation; or may further after obtaining, through calculation, an activity index and/or a preference index of each application on the first terminal, send label information of the activity index and/or preference index of each application on the first terminal to the first terminal, so that a user of the first terminal can select, according to the label information of the activity index and/or preference index of each application that is recommended to the first terminal and on the first terminal, and according to preference of the user, one or more applications for download and installation.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. An application recommending method, comprising:
receiving, by a server from each terminal of first terminals of different types, static data that identifies a type of the terminal and application behavior data corresponding to applications that are on the terminal;
obtaining first indexes by obtaining an index of each application on the first terminals according to the application behavior data;
subsequent to obtaining the first indexes, receiving an application list request from a second terminal, wherein the application list request identifies a first type of the second terminal;
acquiring the first indexes corresponding to the first terminals that are of the first type by querying the first indexes according to the application list request; and recommending an application list according to the first indexes.

2. The method according to claim 1, further comprising:
generating label information for the first indexes according to the first indexes; and
sending the label information to the second terminal.

3. The method according to claim 1, wherein the static data comprises, for each terminal of the first terminals, a terminal model of the terminal, a quantity of central processing unit (CPU) cores of the terminal, a total memory size of the terminal, an available memory size of the terminal, a resolution of the terminal, or an operating system (OS) version number of the terminal.

4. The method according to claim 1, wherein the application behavior data comprises second application behavior data, and wherein the method further comprises obtaining preference indexes for each application on the first terminals based on the second application behavior data.

5. The method according to claim 4, wherein the second application behavior data comprises, for each terminal of the first terminals, occupied memory for running of each application on the terminal or flow consumption for running of each application on the terminal.

6. The method according to claim 1, wherein the application behavior data comprises first application behavior data, and wherein the first indexes comprise activity indexes.

7. The method according to claim 6, further comprising determining second indexes of the first indexes that are greater than a preset first activity index threshold, wherein recommending the application list according to the first indexes comprises recommending first applications corresponding to the second indexes to the second terminal.

8. The method according to claim 6, wherein the first application behavior data comprises installation time, start time, activation time, deactivation time, stop time, or uninstallation time, and wherein the method further comprises determining, for each application on each terminal of the first terminals, an installation duration of the application on the terminal based on the installation time and the uninstallation time, a running duration of the application on the terminal based on the start time and the stop time, an activity duration of the application on the terminal based on the activation time and the deactivation time, a background running duration of the application on the terminal based on the running duration and the activity duration, a number of daily activations of the application on the terminal.

9. The method according to claim 7, wherein the second indexes being greater than the preset first activity index threshold indicates a higher likelihood of application compatibility with the second terminal compared to an activity index less than the preset first activity index threshold.

10. The method according to claim 1, further comprising generating one or more second indexes for each application on the first terminals, wherein the one or more second indexes comprise an occupied memory index, a power consumption index, or a flow consumption index.

11. A server, comprising:
a memory configured to store processor-executable instructions; and
a processor coupled to the memory and configured to execute the processor-executable instructions to cause the server to:
receive, from each terminal of first terminals of different types, static data that identifies a type of the terminal and application behavior data corresponding to applications that are on the terminal;
obtain first indexes by obtaining an index of each application on the first terminals according to the application behavior data;
subsequent to obtaining the first indexes, receive an application list request from a second terminal, wherein the application list request identifies a first type of the second terminal;
acquire the first indexes corresponding to the first terminals that are of the first type by querying the first indexes according to the application list request; and
recommend an application list according to the first indexes.

12. The server according to claim 11, wherein the processor-executable instructions further cause the server to:
generate label information for the first indexes according to the first indexes; and
send the label information to the second terminal.

13. The server according to claim 11, wherein the static data comprises, for each terminal of the first terminals, a terminal model of the terminal, a quantity of central processing unit (CPU) cores of the terminal, a total memory size of the terminal, an available memory size of the terminal, a resolution of the terminal, or an operating system (OS) version number of the terminal.

14. The server according to claim 11, wherein the application behavior data comprises second application behavior data, and wherein the processor-executable instructions further cause the server to obtain preference indexes for each application on the first terminals based on the second application behavior data.

15. The server according to claim 14, wherein the second application behavior data comprises, for each terminal of the first terminals, occupied memory for running of each application on the terminal, power consumption for running of each application on the terminal, or flow consumption for running of each application on the terminal.

16. A system, comprising:
a server configured to:
receive, from each terminal of first terminals of different types, static data that identifies a type of the terminal and application behavior data corresponding to applications that are on the terminal;
obtain first indexes by obtaining an index of each application on the first terminals according to the application behavior data;
subsequent to obtaining the first indexes, receive an application list request from a second terminal, wherein the application list request identifies a first type of the second terminal;
acquire the first indexes corresponding to the first terminals that are of the first type by querying the first indexes according to the application list request; and
recommend an application list according to the first indexes; and
a second terminal configured to:
send the application list request to the server;
receive the application list from the server; and
display the application list.

17. The system according to claim 16, wherein the server is further configured to:
generate label information for the first indexes according to the first indexes; and
send the label information to the terminal.

18. The system according to claim 16, wherein the server is further configured to obtain second indexes for each application on the first terminals, and wherein the second indexes comprise an occupied memory index, a power consumption index, or a flow consumption index.

19. The system according to claim 18, wherein the static data comprises a terminal model, a quantity of central processing unit (CPU) cores, a total memory size, an available memory size, a resolution, or an operating system (OS) version number.

20. The system according to claim 18, wherein the second indexes include the flow consumption index.

* * * * *